Oct. 14, 1952     W. H. HARSTICK ET AL     2,613,968
DRIVE COUPLING FOR CENTRIFUGAL SEPARATORS
Filed July 13, 1949
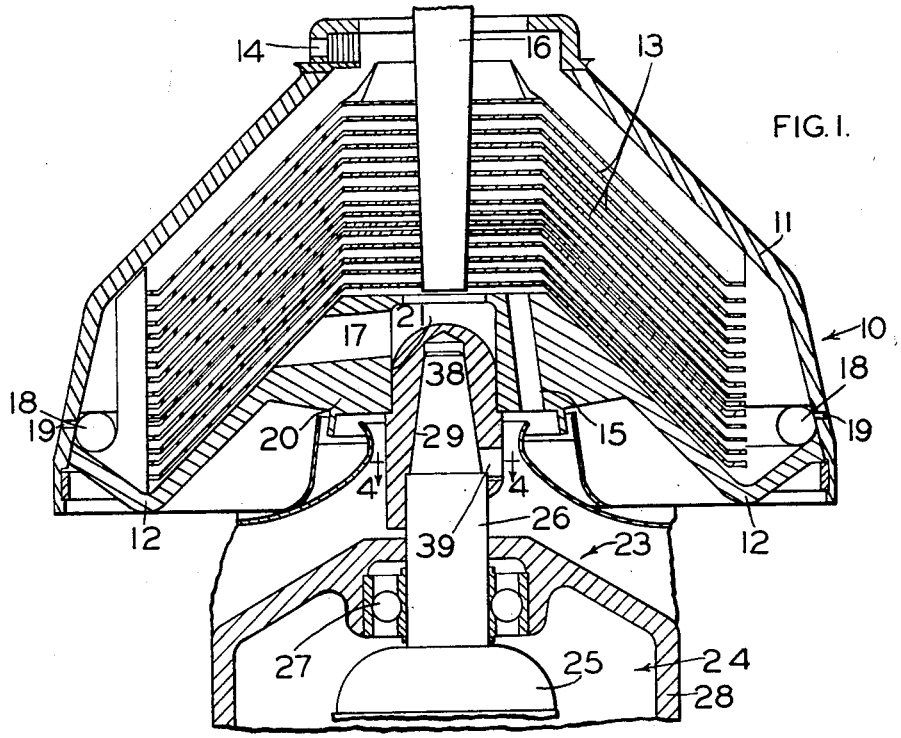
FIG. I.
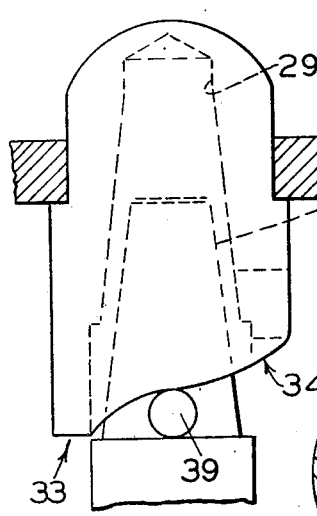
FIG. 2.
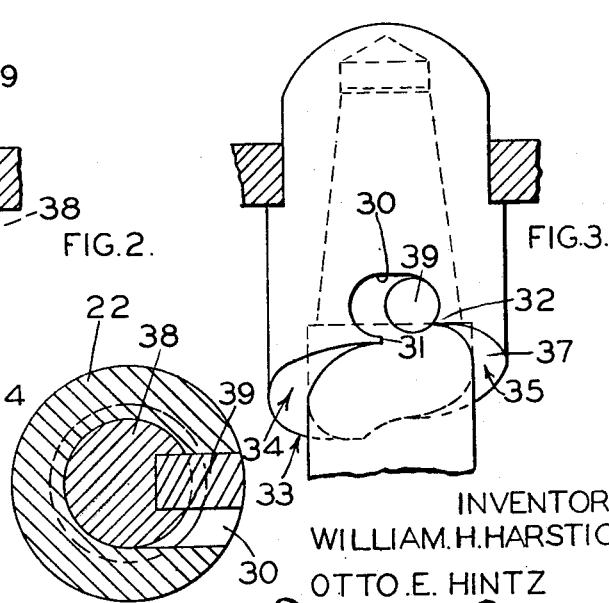
FIG. 3.
FIG. 4.
INVENTORS
WILLIAM. H. HARSTICK
OTTO. E. HINTZ
Paul O. Pippel
ATTY Patented Oct. 14, 1952

2,613,968

UNITED STATES PATENT OFFICE 2,613,968

DRIVE COUPLING FOR CENTRIFUGAL SEPARATORS

William H. Harstick, Oak Park, and Otto E. Hintz, Chicago, Ill., assignors to International Harvester Company, a corporation of New Jersey Application July 13, 1949, Serial No. 104,486

1 Claim. (Cl. 287—103)

This invention relates to a driving connection for a centrifugal cream separator bowl. More specifically, the invention relates to an improved direct drive connection between a cream separator motor and the centrifugal separating bowl.

It is a prime object of this invention to provide an improved driving arrangement for imparting rotating movement from an electric motor to a cream separator bowl.

Another object is to provide a novel driving connection for a cream separating bowl, the connection including a conical spindle adapted to engage a conical socket formed in the bowl portion, said connection including means whereby the separating bowl may be quickly assembled into driving engagement with the conical spindle.

A still further object is to provide a positive driving connection for a cream separator bowl, the connection including a conical spindle on which the bowl is centered for driving engagement, said conical spindle including means engageable by the bowl to securely position the parts in driving engagement.

Applicant's novel driving connection for the cream separator bowl consists essentially of a connecting member which is securely connected to a central portion of the bowl proper. The connecting member includes a conical bore or socket which is adapted to be engaged in driving relation by means of a spindle having a conical surface in telescoping engaging with the conical bore of the connecting member. The spindle also includes a transversely projecting pin which is adapted to be received in a slot or pocket formed in the connecting member. The conical spindle may be readily assembled into driving relation with the conical bore by means of a plurality of cam surfaces which are formed on the lower portion of the connecting member. The bowl is placed upon the spindle and the transversely extending pin engages the cam surface of the connecting member. The cam surfaces slope upwardly toward the pocket. The weight of the bowl is downwardly upon the transversely extending pin and by virtue of the cam arrangement the bowl is rotated and the pin is thereupon guided into the receiving pocket. The receiving pocket is provided with a pair of hook portions which engage the pin in driving relation. Thus a secure, efficient and positive driving connection is provided between the power unit and the separating bowl.

Other advantages and improvements will become more readily apparent as the description is read in connection with the drawing.

In the drawing:

Fig. 1 is a side elevational view showing a separating bowl and an electric power unit for rotating the bowl, the disclosure showing a cross-section through the parts.

Fig. 2 is a detail elevational view of a connecting member for a separating bowl, the connecting member showing one position of a driving spindle as it is assembled with the driving connection of the bowl.

Fig. 3 is an elevational view of a connecting member for a separating bowl, the connecting member being shown in driving engagement with a power driven spindle.

Fig. 4 is a sectional view through the driving connection taken substantially along the line 4—4 of Fig. 1.

A separating bowl is generally designated by the reference character 10. The separating bowl includes an upper bowl shell 11 and a lower shell 12 securely connected together as a unitary structure. A plurality of separating disks 13 are positioned in superposed relation within the separating bowl 10. The separating bowl 10 includes the usual skim milk outlet 14 formed in the upper bowl shell 11. A cream outlet 15 is formed in the lower bowl shell 12. A milk feed tube 16 extends downwardly into the separating bowl 10 for distributing whole milk to a distributing chamber 17. The present separating bowl disclosed is of a power washing type and includes a centrifugally expansible sealing ring 18 which is adapted to engage and seal an annular washing liquid discharge opening 19 during high speeds of rotation of the separating bowl. The operation of the separating bowl is believed to be readily apparent to those skilled in the art and it is not deemed necessary to elaborate on the function of the bowl.

The lower bowl shell 12 is provided with a central base section 20. The base section 20 includes a vertically extending bore 21. A connecting member 22 is securely drive-fitted into the bore 21 so that rotation of the connecting member 22 is imparted to the bowl 10.

Driving means for the separating bowl is generally designated by the reference character 23. The driving means 23 includes an electric power unit 24 which includes an armature 25. The armature 25 is arranged to drive a spindle 26 which is rotated in a ball bearing structure 27 rigidly secured in a housing 28.

The connecting member 22 includes a tapered or vertically extending conical bore or socket 29 which is adapted to be engaged by the spindle 26. The connecting member 22 also includes a recess or slot forming a keying pocket 30 extending in the direction of rotation of the connecting member 22. The keying pocket 30 includes a pair of opposed hook-shaped members 31 and 32, the purpose of which will become presently apparent.

The lower end of the connecting member 22 is provided with an annular surface generally designated at 33. The surface 33 includes a pair of irregular camming surfaces 34 and 35. The camming surfaces 34 and 35 are positioned opposite to each other and slope upwardly in a converging direction toward the keying pocket 30. The camming surfaces 34 and 35 are shaped in the form of a helix or spiral 37 as best shown in Fig. 3.

The spindle 26 includes a conical or tapered extension 38 which is adapted to mate with the socket 29 or engage the same in telescoping relation. A pin 39 extends transversely with respect to the conical extension 38, the pin 39, as best shown in Fig. 3, being adapted to engage the keying pocket 30 in driving relation.

In order to assemble the bowl 10 quickly with the electric power unit 24, the operator simply places the bowl so that the conical socket 29 is over the conical extension 38. At this point the pin 39 engages one of the irregular camming surfaces 34 or 35. The weight of the bowl proper 10 is therefore upon the pin 39 and by virtue of the camming surfaces 34 and 35 the bowl is rotated relative to the spindle 26. The pin 39 travels upwardly on either of the camming surfaces 34 and 35 until it falls into engagement with the keying pocket 30. At this point the operator is assured that a positive and direct driving engagement takes place between the connecting member and the electric power unit. No examination of the driving connection is necessary and it can readily be seen that the assembly of the bowl with the driving connection is facilitated. Time need not be consumed in making this connection since the connection occurs in an automatic manner by simply placing the bowl over the spindle of the electric power unit. The camming surfaces 34 and 35 are so arranged that the spindle is guided into driving engagement with the pocket without any manipulation on the part of the operator.

The conical engagement of the spindle with the keying member provides for a positive driving relation. The conical engagement of the parts also assures that the bowl is properly set in a level position and alined for the high speeds of rotation at which it is driven. In order to secure the bowl against axial displacement with respect to its driving spindle, the hooks 31 and 32 are provided. The hook 32 engages the pin 39 in the position shown in Fig. 3 and it can clearly be seen that by this arrangement complete assurance is had that the bowl will not be axially displaced with respect to the spindle during rotation. As the speed of the electric unit slackens upon shutting off the electric current, there is a tendency due to the inertia of the bowl for the bowl to creep on the spindle so that the hook 32 no longer secures the pin 39. In the event that this action takes place the hook 31 immediately will be in a position to secure and engage the pin 39, thus also securing the bowl axial displacement. It will be noted that the hook 31 is disposed axially below the level of the hook 32. The distance or vertical space between the hooks when measured in a horizontal plane is therefore less than the diameter of the pin. This then, prevents the displacement of the bowl from the spindle in a direct axial direction. On the other hand the distance measured in a straight line from hook 31 to hook 32 is wider than the diameter of the spindle so that the pin can enter between the hooks and easily be centered in the slot after it leaves the camming surfaces of the connection member. By the lower position of the hook 31, then, the positive driving connection is assured between the spindle and connecting member despite relative rotation between said members.

It can now be seen that a novel and positive driving connection has been provided for a cream separator bowl. By this novel improvement the separating bowl can be quickly assembled into its driving relation with the spindle of a power unit with full assurance that a complete positive driving connection is secured. The objects of the invention therefore have been completely achieved and it must be understood that changes and modifications may be made which do not depart from the spirit of the invention as disclosed nor the scope thereof as defined in the appended claim.

What is claimed is:

A drive coupling for a centrifugal separator, said coupling comprising a connecting member having a tapered bore extending in an axial direction and being open at its lower end, an annular portion formed at the lower end of said connecting member, said annular portion including a pair of opposed irregular cam surfaces extending in spirally shaped relation, said connecting member having an elongated transversely extending slot formed adjacent upwardly sloping ends of the cam surfaces, first and second laterally spaced hook portions formed at opposite ends of said slot in said connecting member, drive means for engaging said connecting member in driving relation, said drive means including a spindle having a tapered portion engaging the tapered bore of the connecting member in mating relation, a drive pin projecting laterally outwardly from the spindle, said first hook portion having its end positioned axially below the end of said second hook portion, the ends of said hook portions when measured in a horizontal plane defining a vertical space of lesser dimension than the diameter of said pin, the distance between said ends of said hook portions when measured in a straight line connecting the ends of the hook portion being greater than the diameter of said pin, said pin being engageable in driving relation with said slot, the hook portions being constructed and arranged to retain the pin in said slot against axial displacement during rotation of said spindle and connecting member.

WILLIAM H. HARSTICK.
OTTO E. HINTZ.

REFERENCES CITED

The following references are of record in the file of this patent:

UNITED STATES PATENTS

| Number | Name | Date |
|---|---|---|
| 672,494 | Robertson | Apr. 23, 1901 |
| 1,241,713 | Dahlquist | Oct. 2, 1917 |
| 1,294,017 | Young | Feb. 11, 1919 |
| 2,460,216 | Dalton | Jan. 25, 1949 |

FOREIGN PATENTS

| Number | Country | Date |
|---|---|---|
| 23,321 | Great Britain | Oct. 11, 1897 |